United States Patent
Chung et al.

(10) Patent No.: US 9,723,189 B2
(45) Date of Patent: Aug. 1, 2017

(54) PORTABLE ELECTRONIC-DEVICES AND METHODS FOR IMAGE EXTRACTION

(71) Applicant: Acer Incorporated, New Taipei (TW)

(72) Inventors: Hsing-Lung Chung, New Taipei (TW); Jian-Wei Lee, New Taipei (TW); Wu-Chu Tsai, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/596,401

(22) Filed: Jan. 14, 2015

(65) Prior Publication Data
US 2015/0334287 A1    Nov. 19, 2015

(30) Foreign Application Priority Data
May 13, 2014 (TW) .............................. 103116790 A

(51) Int. Cl.
    *H04N 5/225*    (2006.01)
    *H04N 5/232*    (2006.01)

(52) U.S. Cl.
    CPC ....... *H04N 5/2258* (2013.01); *H04N 5/23212* (2013.01); *H04N 5/23222* (2013.01)

(58) Field of Classification Search
    CPC ............. H04N 5/23212; H04N 5/2258; H04N 5/23222; H04N 5/23293; H04N 5/23219; G03B 13/36
See application file for complete search history.

(56) References Cited

U.S. PATENT DOCUMENTS

| | | | |
|---|---|---|---|
| 9,066,000 B2 | 6/2015 | Kuo et al. | |
| 9,110,367 B2 | 8/2015 | Yamada et al. | |
| 2005/0046740 A1* | 3/2005 | Davis | H04N 5/2254 348/373 |
| 2008/0030592 A1* | 2/2008 | Border | H04N 5/232 348/218.1 |
| 2010/0165120 A1* | 7/2010 | Chang | H04N 5/2251 348/207.99 |

(Continued)

FOREIGN PATENT DOCUMENTS

| | | |
|---|---|---|
| JP | 2012-105058 | 5/2012 |
| TW | 201328321 | 7/2013 |

OTHER PUBLICATIONS

Chinese language office action dated Aug. 5, 2015, issued in application No. TW 103116790.

*Primary Examiner* — Luong T Nguyen
(74) *Attorney, Agent, or Firm* — McClure, Qualey & Rodack, LLP

(57) ABSTRACT

A portable electronic-device adapted to photograph an object including a first camera module, a second camera module, a processing unit and a control unit. The first camera module obtains a first reference image according to a first predetermined focal length. The second camera module obtains a second reference image according to a second predetermined focal length. The processing unit determines the photographed focal length according to the first reference image and the second reference image. The control unit controls the first camera module or the second camera module to photograph the object according to the photographed focal length. The first camera module and the second camera module face toward a direction corresponding to the object.

9 Claims, 5 Drawing Sheets

(56) References Cited

U.S. PATENT DOCUMENTS

| | | | |
|---|---|---|---|
| 2012/0327195 A1* | 12/2012 | Cheng | H04N 5/23212 348/47 |
| 2013/0038700 A1* | 2/2013 | Horita | G02B 7/36 348/47 |
| 2013/0063566 A1* | 3/2013 | Morgan-Mar | G06T 7/0069 348/46 |
| 2013/0155511 A1* | 6/2013 | Peng | G02B 13/18 359/557 |
| 2013/0162782 A1* | 6/2013 | Kuo | H04N 13/0239 348/47 |
| 2013/0322862 A1* | 12/2013 | Hsu | G02B 7/285 396/125 |

\* cited by examiner

PORTABLE ELECTRONIC-DEVICES AND METHODS FOR IMAGE EXTRACTION

CROSS REFERENCE TO RELATED APPLICATIONS

This application claims priority of Taiwan Patent Application No. 103116790, filed on May 13, 2014, the entirety of which is incorporated by reference herein.

BACKGROUND OF THE INVENTION

Field of the Invention

The application relates in general to a portable electronic-device and a method for image extraction, and in particular to a portable electronic-device and an image extraction method using a dual lens with different focal lengths for extracting the focal length of an object.

Description of the Related Art

These days, due to electronic-devices being easy to carry and having been developed rapidly, a user can take a photo by using a smart device with a lens or a camera. In general, the method for focusing on an object is to move the lens using motor, and to determine the best focal length by calculating the clarity of the referenced image of the object. However, the results of this focusing method are affected by different factors, such as the in-focus time being too long, or the object being out of focus. Thus, how to obtain the best focal length for an object is a problem which needs to be solved immediately.

BRIEF SUMMARY OF INVENTION

An embodiment of the invention provides a portable electronic-device, adapted to photograph objects, includes a first camera module, a second camera module, a processing unit and a control unit. The first camera module obtains a first reference image according to a first predetermined focal length. The second camera obtains a second reference image according to a second predetermined focal length. The processing unit determines the photographed focal length according to the first reference image and the second reference image. The control unit controls the first camera module or the second camera module to photograph the object according to the photographed focal length. The first camera module and the second camera module face the object being photographed.

Another embodiment of the invention provides a portable electronic-device, adapted to photograph objects, that includes a first camera module, a second camera module and a control unit. The first camera module faces a first direction. The second camera switchably faces the first direction or a second direction, wherein the first direction is opposite to the second direction. The control unit controls the second camera to face the first direction when taking a photo, and controls the first camera module and the second camera module to photograph the object.

Another embodiment of the invention provides a method for image extraction adapted to a portable electronic-device, the steps comprising: controlling a first camera module and a second camera module to face a direction that corresponds to the position of the object being photographed; controlling the first camera module to obtain a first reference image of the object according to a first predetermined focal length; controlling the second camera module to obtain a second reference image of the object according to a second predetermined focal length; determining the photographed focal length of the object according to the first reference image and the second reference image; controlling the first camera module or the second camera module to photograph the object with the photographed focal length.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas of applicability of the present devices and methods will become apparent from the detailed description provided herein. It should be understood that the detailed description and specific examples, while indicating exemplary embodiments of the electronic-devices and the methods for displaying user interface, are intended for purposes of illustration only and are not intended to limit the scope of the invention.

Figure 1:
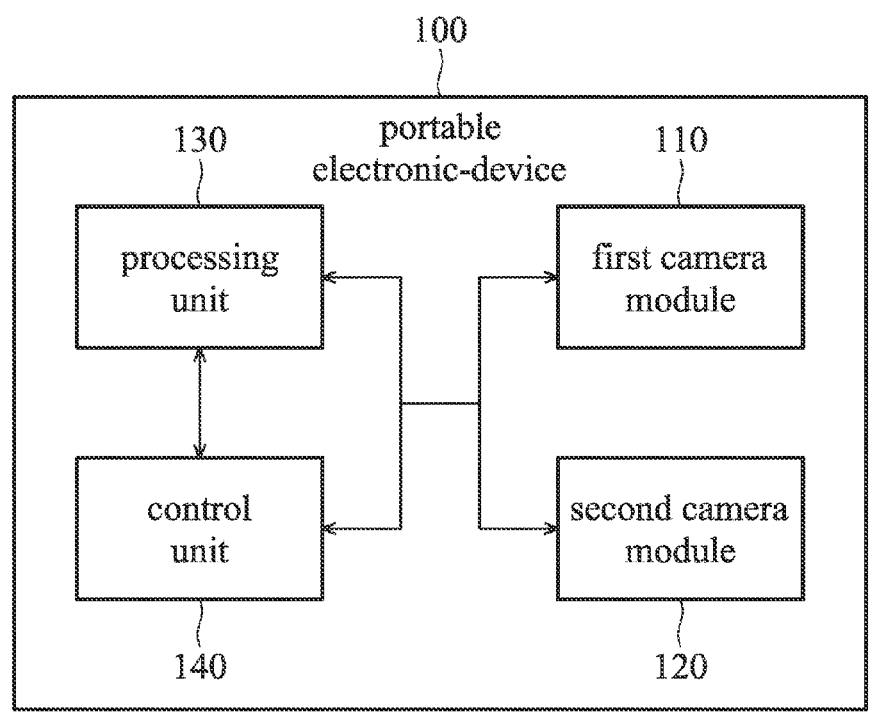
FIG. 1 is a block diagram of a portable electronic-device in accordance with an embodiment of the invention.

FIG. 1 is a block diagram of a portable electronic-device in accordance with an embodiment of the invention. As shown in FIG. 1, the portable electronic-device 100 includes a first camera module 110, a second camera module 120, a processing unit 130 and a control unit 140. The portable electronic-device 100 can be a smart phone or a tablet, etc. In addition, the portable electronic-device 100 can further include a memory unit, touching unit, or other modules. Since the technical features of the modules are similar to the prior art, thus they will not be described herein. The first camera module 110 module obtains a first reference image according to a first predetermined focal length. The second camera module 120 obtains a second reference image according to a second predetermined focal length. The processing unit 130 determines the photographed focal length of the object according to the first reference image and the second reference image. The control unit 140 controls the first camera module 110 or the second camera module 120 to photograph the object according to the photographed focal length. The first camera module 110 and the second camera module 120 face the object being photographed.

Figure 2A:
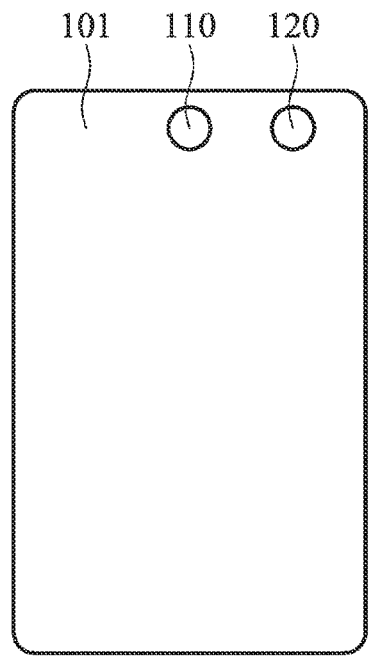
FIGS. 2A and 2B are schematic diagrams of a portable electronic-device in accordance with an embodiment of the invention.
Figure 2B:
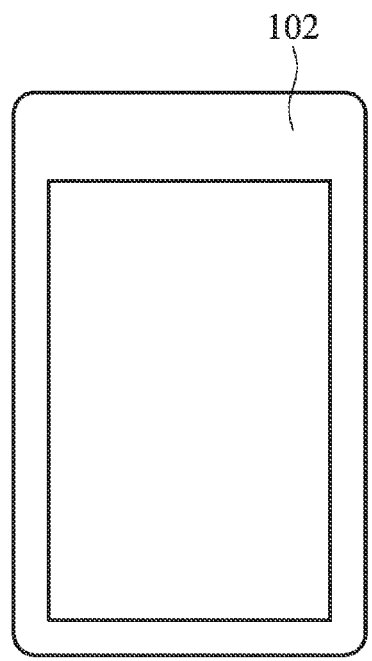

FIGS. 2A and 2B are schematic diagrams of a portable electronic-device in accordance with an embodiment of the invention. As shown in FIGS. 2A and 2B, the portable electronic-device 100 includes a first surface 101 and a second surface 102. The first surface 101 is on the opposite side of the second surface 102. According to an embodiment of the invention, the first camera module 110 and the second camera module 120 can be arranged on the first surface 101 or the second surface 102. In the embodiment, the first camera module 110 and the second camera module 120 are arranged on the first surface 101, and aligned in a first direction. The first direction is perpendicular to the first surface 101.

Figure 3:
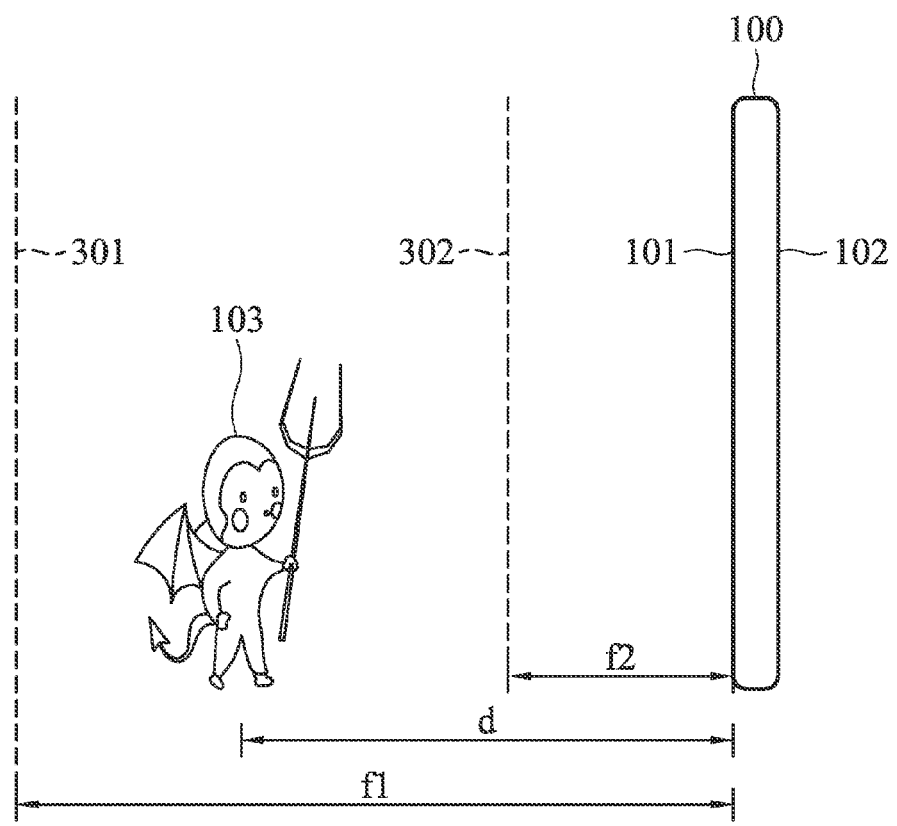
FIG. 3 is a schematic diagram for photoing an object by using the portable electronic-device in accordance with an embodiment of the invention.

Please refer to FIG. 3. FIG. 3 is a schematic diagram for photographing an object by using the portable electronic-device in accordance with an embodiment of the invention. As shown in FIG. 3, the user arranges the first camera module 110 and the second camera module 120 (not shown) on the first surface 101 to align to the direction of the object 103 when the user wants to take a photo, and the object 103 will be in the shooting range of the first camera module 110 and the second camera module 120. When the object 103 is in the shooting range of the first camera module 110 and the second camera module 120, the first camera module 110 module obtains the first reference image of the object 103 according to a first predetermined focal length f1, and the second camera module 120 obtains a second reference image of the object 103 according to a second predetermined focal length f2. According to an embodiment of the invention, the distance d between the object 103 and the portable electronic-device 100 is 70 cm, the first camera module 110 module obtains the first reference image of the object 103 with 110 cm as the first predetermined focal length f1, and the second camera module 120 obtains a second reference image of the object 103 with 10 cm as the second predetermined focal length f2 when the object 103 is in the shooting range of the first camera module 110 and the second camera module 120. In general, as shown in FIG. 3, the first predetermined focal length f1 is greater than the distance d between the object 103 and the portable electronic-device 100, and the second predetermined focal length f2 is smaller than the distance d between the object 103 and the portable electronic-device 100 or the smallest focal length. In other words, the photographed focal length is between the first predetermined focal length f1 and the second predetermined focal length f2. It should be noted that the first predetermined focal length f1 and the second predetermined focal length f2 can be set by the user, and both the first predetermined focal length f1 and the second predetermined focal length f2 can be greater or smaller than the photographed focal length. The first predetermined focal length f1 is defined as the distance between the first camera module 110 module and the second camera module 120 and the first focus plane 301, and the second predetermined focal length f2 is defined as the distance between the first camera module 110 module and the second camera module 120 and the first focus plane 302.

After obtaining the first reference image and the second reference image, the processing unit 130 obtains an accurate focal length of the object 103 which corresponds to the first camera module 110 and the second camera module 120 according to the image information of the first reference image and the second reference image.

According to an embodiment of the present invention, the processing unit 130 obtains different weights of the definition of the images according to different focal lengths for accurately calculating the distance between the object 103 and the first camera module 110 and the second camera module 120. Please refer to table 1. Table 1 represents the different weights corresponding to different positions when using different focal lengths. For example, the first weight of the first definition of the first reference image is 0.6 when the first camera module 110 photos the object 103 with the first predetermined focal length f1 which is 110 cm; the weight of the second definition of the second reference image is 0.4 when the second camera module 120 photos the object with the second predetermined focal length f2 which is 10 cm. The processing unit 130 obtains a distance which is 70 cm between the object 103 and the first camera module 110 and the second camera module 120 according to the first weight and the second weight.

TABLE 1

|  | Focal length | |
| Distance | 110 cm | 10 cm |
| --- | --- | --- |
| 10 cm | 0 | 1.0 |
| 20 cm | 0.1 | 0.9 |
| 30 cm | 0.2 | 0.8 |
| 40 cm | 0.3 | 0.7 |
| 50 cm | 0.4 | 0.6 |
| 60 cm | 0.5 | 0.5 |
| 70 cm | 0.6 | 0.4 |
| 80 cm | 0.7 | 0.3 |
| 90 cm | 0.8 | 0.2 |
| 100 cm | 0.9 | 0.1 |
| 110 cm | 1.0 | 0 |

Next, the control unit 140 selects the first camera module 110 or the second camera module 120 to photograph the object 103 according to the first predetermined focal length f1 of the first camera module 110 and the second predetermined focal length f2 of the second camera module 120. After the processing unit obtains the photographed focal length of the object 103, the control unit 140 determines to use the first camera module 110 or the second camera module 120 to photograph the object 103 according to the first predetermined focal length f1, the second predetermined focal length f2 and the photographed focal length. According to the embodiment, the distance between the object 103 and the first camera module 110 and the second camera module 120 is 70 cm, which means the moving distance of the first camera module 110 from the first predetermined focal length f1 to the photographed focal length is 40 cm, and the moving distance of the second camera module 120 from the second predetermined focal length f2 to the photographed focal length is 60 cm. Therefore, the control unit 140 controls the camera module which has the shortest moving distance, e.g. the first camera module 110 in the embodiment, to photograph the object 103 according to the photographed focal length.

Figure 4A:
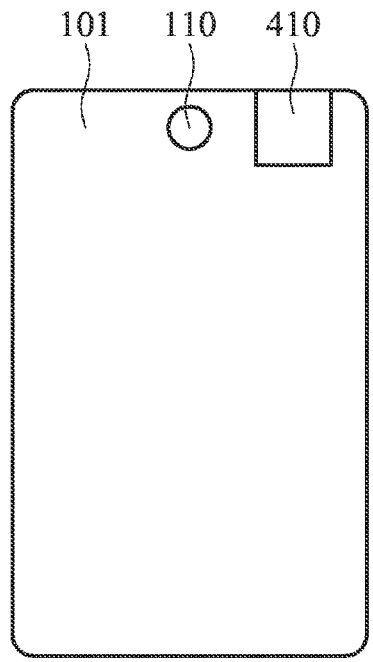
FIGS. 4A and 4B are schematic diagrams of a portable electronic-device in accordance with another embodiment of the invention.
Figure 4B:
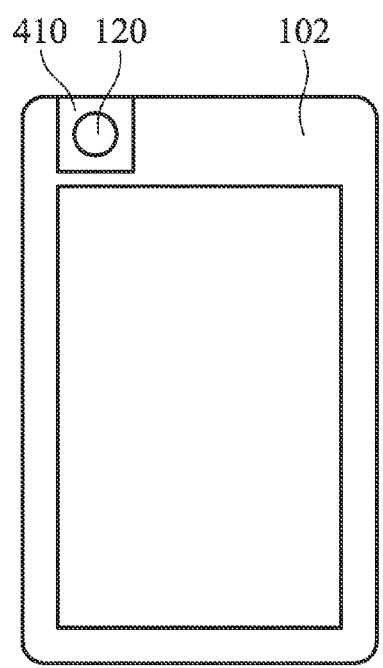

FIGS. 4A and 4B are schematic diagrams of a portable electronic-device in accordance with another embodiment of the invention. As shown in FIGS. 4A and 4B, the portable electronic-device 100 further includes a pivoting structure 410, and the second camera module 120 is arranged on the pivoting structure 410. The first camera module 110 faces the object 103 so that the object 103 is located in the shooting range of the first camera module 110 when the user wants to photograph the object 103. The detecting unit (not shown) further determines whether both the first camera module 110 and the second camera module are facing the object 103 or not when the user enables the cameras. According to an embodiment of the present invention, the first camera module 110 obtains the first reference image of the object 103 according to the first predetermined focal length f1, and the second camera module 120 obtains the second reference image of the object 103 according to the second predetermined focal length f2 when both the first camera module 110 and the second camera module 120 face the object 103.

According to another embodiment of the present invention, when the detecting unit determines that the first camera module 110 and the second camera module 120 do not face to the same direction, the detecting unit notices the control unit 140 to enable a flipping function of the pivoting structure 410 or the user can flip the pivoted structure for changing the photoing direction of the second camera module 120, so that both the first camera module 110 and the second camera module 120 will face the object 103. For example, when the object 103 is at the side of the first surface 101 of the portable electronic-device 100, and the second camera module 120 is at the side of the second surface 102, the detecting unit notices the control unit 140 to enable the flipping function of the pivoting structure 410 to make the second camera module 120 flipped to the first surface 101. Or the user can press a physical button on the portable electronic-device 100 or touch an icon of the user interface to enable the flipping function of the pivoting structure 410 so that both the first camera module 110 and the second camera module 120 will face the object 103.

When both the first camera module 110 and the second camera module 120 face the object 103, the first camera module 110 obtains the first reference image of the object 103 according to the first predetermined focal length, and the second camera module 120 obtains the second reference image of the object 103 according to the second predetermined focal length f2. The processing unit 130 obtains the accurate focal length of the object 103 corresponding to the first camera module and the second camera module according to the first reference image and the second reference image after receiving the first reference image and the second reference image. Since the steps are similar to the described embodiment, they will not be described herein.

Figure 5:
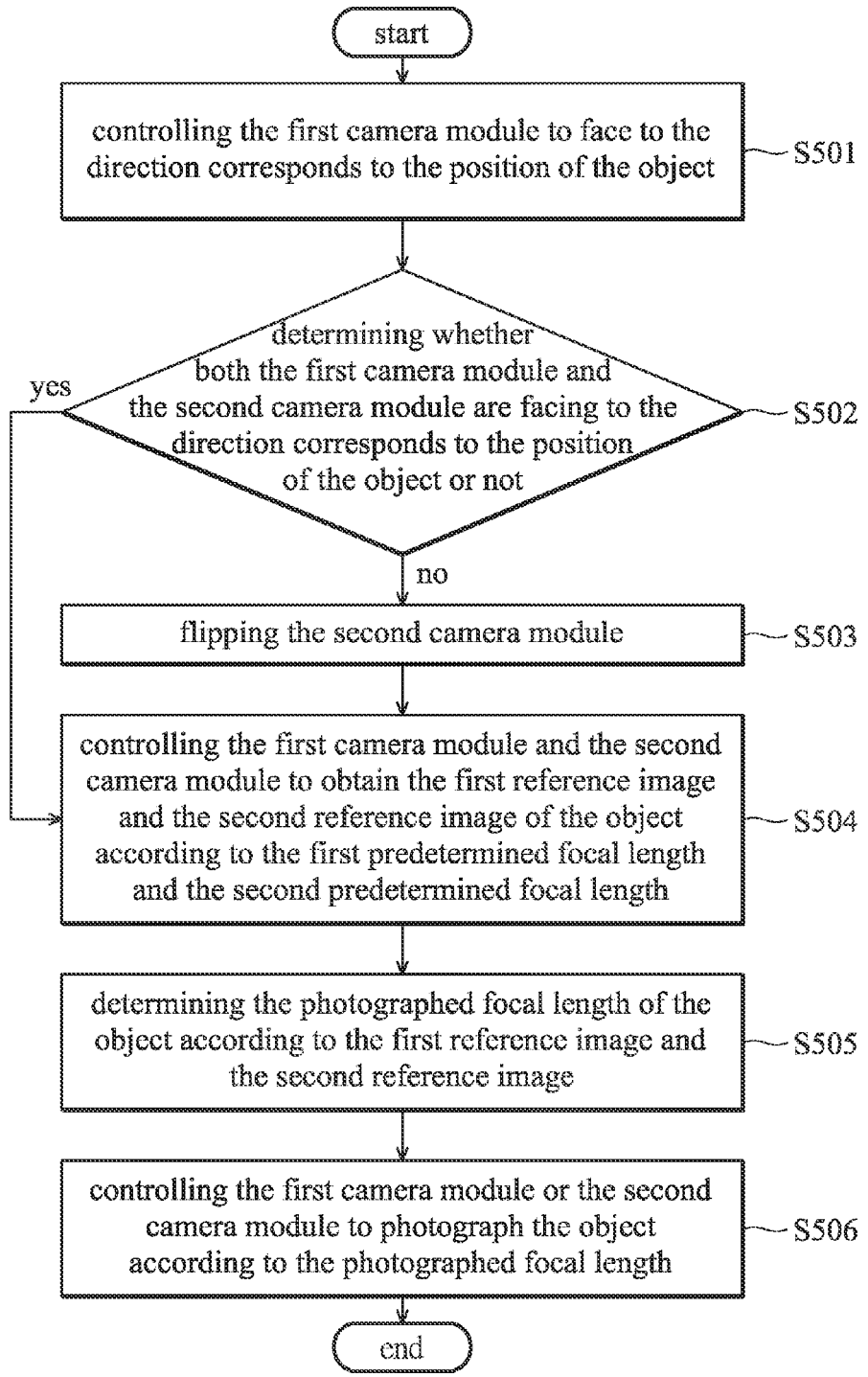
FIG. 5 is a flow chart of a method for image extraction in accordance with an embodiment of the invention.

Please refer to FIG. 1 with FIG. 5. FIG. 5 is a flow chart of a method for image extraction in accordance with an embodiment of the invention. First, in step S501, the user makes the first camera module 110 to face the object 103. In step S502, the detecting unit determines whether both the first camera module 110 and the second camera module are facing the object 103 or not. If the second camera module 120 is not facing to the object 103, then the method goes to step S503, and the second camera module is flipped to face the object 103. If both the first camera module 110 and the second camera module 120 face the object 103, the method goes to the step S504. The second camera module 120 is arranged on the pivoting structure 410. When the detecting unit determines that the first camera module 110 and the second camera module 120 do not face to the same direction, the detecting unit notifies the control unit 140 to enable a flipping function of the pivoting structure 410 or the user can flip the pivoting structure to change the direction of the second camera module 120, so that both the first camera module 110 and the second camera module 120 face the object 103. For example, when the object 103 is at the side of the first surface 101 of the portable electronic-device 100, and the second camera module 120 is at the side of the second surface 102, the detecting unit notifies the control unit 140 to enable the flipping function of the pivoting structure 410 to flip the second camera module 120 flipped to the first surface 101. Or the user can press a physical button on the portable electronic-device 100 or touch an icon of the user interface to enable the flipping function of the pivoting structure 410 so that both the first camera module 110 and the second camera module 120 face the object 103.

Next, step S504 involves controlling the first camera module 110 module to obtain the first reference image of the object 103 according to a first predetermined focal length f1, and controlling the second camera module 120 to obtain a second reference image of the object 103 according to a second predetermined focal length f2. According to an embodiment of the invention, the distance d between the object 103 and the portable electronic-device 100 is 70 cm, the first camera module 110 module obtains the first reference image of the object 103 with 110 cm as the first predetermined focal length f1, and the second camera module 120 obtains a second reference image of the object 103 with 10 cm as the second predetermined focal length f2 when the object 103 is in the shooting range of the first camera module 110 and the second camera module 120. In general, the first predetermined focal length f1 is greater than the distance d between the object 103 and the portable electronic-device 100, and the second predetermined focal length f2 is smaller than the distance d between the object 103 and the portable electronic-device 100 or the smallest focal length. In other words, the photographed focal length is between the first predetermined focal length f1 and the second predetermined focal length f2. It should be noted that the first predetermined focal length f1 and the second predetermined focal length f2 can be set by the user, and both the first predetermined focal length f1 and the second predetermined focal length f2 can be greater or smaller than the photographed focal length.

In step S405, the processing unit 130 obtains the accurate focal length corresponded to the first camera module 110 and the second camera module 120 according to the image information of the first reference image and the second reference image.

According to an embodiment of the present invention, the processing unit 130 obtains different weights of the definition of the images according to different focal lengths for calculating the accurate distance between the object 103 and the first camera module 110 and the second camera module 120. Please refer to table 1, table 1 represents the different weights corresponding to different positions when using different focal lengths. For example, the first weight of the first definition of the first reference image is 0.6 when the first camera module 110 photos the object 103 with the first predetermined focal length f1 which is 110 cm; the second weight of the second definition of the second reference image is 0.4 when the second camera module 120 photos the object with the second predetermined focal length f2 which is 10 cm. The processing unit 130 obtains a distance which is 70 cm between the object 103 and the first camera module 110 and the second camera module 120 according to the first weight and the second weight.

Next, at step S506, the control unit 140 selects the first camera module 110 or the second camera module 120 to photograph the object 103 according to the first predetermined focal length f1 of the first camera module 110 and the second predetermined focal length f2 of the second camera module 120. After the processing unit obtains the photographed focal length of the object 103, the control unit 140 determines to use the first camera module 110 or the second camera module 120 to photograph the object 103 according to the first predetermined focal length f1, the second predetermined focal length f2 and the photographed focal length. According to the embodiment, the distance between the object 103 and the first camera module 110 and the second camera module 120 is 70 cm, which means that the moving distance of the first camera module 110 from the first predetermined focal length f1 to the photographed focal length is 40 cm, and the moving distance of the second camera module 120 from the second predetermined focal length f2 to the photographed focal length is 60 cm. Therefore, the control unit 140 controls the camera module which has the shortest moving distance, e.g. the first camera module 110 in the embodiment, to photograph the object 103 according to the photographed focal length.

As described above, an embodiment of the invention provides a portable electronic-device and a method for image extraction. The user obtains different reference images according to different focal lengths with two lenses, and obtains the weights of the object corresponding to different definitions according to the reference images. Finally, an accurate photographed focal length can be calculated according to the weights. As the result, the time for moving the lens and the error rate for obtaining the best focal length according to the algorithm are reduced, and the focusing speed and accuracy are increased.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A portable electronic-device, adapted to photograph an object, comprising:
    a first camera module, focusing to a first focus plane by using a first predetermined focal length for obtaining a first reference image of the object;
    a second camera module, focusing to a second focus plane by using a second predetermined focal length for obtaining a second reference image of the object;
    a processing unit, obtaining a photographed focal length corresponding to a focus plane of the object according to a first weight of the object obtained based on a first definition of the object in the first reference image and a second weight of the object obtained based on a second definition of the object in the second reference image; and
    a control unit, controlling the first camera module or the second camera module to obtain an image of the object by using the photographed focal length,
    wherein the first camera module and the second camera module face toward the object;
    wherein the first camera module and the second camera module are arranged on a first surface of the portable electronic-device; and
    wherein the first focus plane is different from the second focus plane, and the first predetermined focal length is different from the second predetermined focal length.

2. The portable electronic-device as claimed in claim 1, wherein the control unit further controls the first camera module or the second camera module to photograph the object according to the first predetermined focal length, the second predetermined focal length and the photographed focal length.

3. The portable electronic-device as claimed in claim 1, wherein the first camera module further obtains the first reference image according to a longest focal length, and the second camera module further obtains the second reference image according to a shortest focal length.

4. A portable electronic-device, adapted to photograph an object, comprising:
    a first camera module, facing a first direction, and focusing to a first focus plane by using a first predetermined focal length for obtaining a first reference image of the object;
    a second camera module, facing the first direction and a second direction switchably, and focusing to a second focus plane by using a second predetermined focal length for obtaining a second reference image of the object, wherein the first direction is opposite to the second direction;
    a processing unit, obtaining a photographed focal length corresponding to a focus plane of the object according to a first weight of the object obtained based on a first definition of the object in the first reference image and a second weight of the object obtained based on a second definition of the object in the second reference image; and
    a control unit, controlling the first camera module or the second camera module to obtain an image of the object by using the photographed focal length;
    wherein the first camera module and the second camera module are arranged on a first surface of the portable electronic-device; and
    wherein the first focus plane is different from the second focus plane, and the first predetermined focal length is different from the second predetermined focal length.

5. The portable electronic-device as claimed in claim 4, wherein the control unit further controls the first camera module or the second camera module to photograph the object according to the first predetermined focal length, the second predetermined focal length and the photographed focal length.

6. The portable electronic-device as claimed in claim 4, wherein the first camera module further obtains the first reference image according to a greatest focal length, and the second camera module further obtains the second reference image according to a smallest focal length.

7. A method for image extraction, adapted to a portable electronic-device, comprising:
    controlling a first camera module and a second camera module to face toward an object;
    controlling the first camera module to focus to a first focus plane by using a first predetermined focal length for obtaining a first reference image of the object;
    controlling the second camera module to focusing to a second focus plane by using a second predetermined focal length for obtaining a second reference image of the object;
    obtaining a photographed focal length corresponding to a focus plane of the object according to a first weight of the object obtained based on a first definition of the object in the first reference image and a second weight of the object obtained based on a second definition of the object in the second reference image; and
    controlling the first camera module or the second camera module to obtain an image of the object by using the photographed focal length;
    wherein the first camera module and the second camera module are arranged on a first surface of the portable electronic-device; and
    wherein the first focus plane is different from the second focus plane, and the first predetermined focal length is different from the second predetermined focal length.

8. The method as claimed in claim 7, further comprising:
    controlling the first camera module or the second camera module to photograph the object according to the first predetermined focal length, the second predetermined focal length and the photographed focal length.

9. The method as claimed in claim 7, further comprising:
    controlling the first camera module to obtain the first reference image of the object according to a greatest focal length; and controlling the second camera module to obtain a second reference image of the object according to a smallest focal length.

* * * * *